United States Patent [19]
Freid

[11] Patent Number: 5,452,575
[45] Date of Patent: Sep. 26, 1995

[54] AIRCRAFT GAS TURBINE ENGINE THRUST MOUNT

[75] Inventor: Wilbert B. Freid, Bridgton, Me.

[73] Assignee: General Electric Company, Cincinnati, Ohio

[21] Appl. No.: 116,621

[22] Filed: Sep. 7, 1993

[51] Int. Cl.⁶ ..................................................... F02C 7/20
[52] U.S. Cl. ........................... 60/39.31; 248/554; 244/54
[58] Field of Search .................................. 60/39.31, 39.32; 248/554; 244/55 R, 54

[56] References Cited

U.S. PATENT DOCUMENTS

| | | |
|---|---|---|
| 3,675,418 | 7/1972 | Lenkeit et al. . |
| 3,844,115 | 10/1974 | Freid . |
| 4,013,246 | 3/1977 | Nightingale ............................... 244/54 |
| 4,022,018 | 5/1977 | Tuten et al. . |
| 4,266,741 | 5/1981 | Murphy . |
| 4,326,682 | 4/1982 | Nightingale . |
| 4,428,189 | 1/1984 | Greenberg et al. . |
| 4,458,863 | 7/1984 | Smith ........................................ 244/54 |
| 4,471,609 | 9/1984 | Porter et al. . |
| 4,555,078 | 11/1985 | Grognard ............................... 60/39.31 |
| 4,603,821 | 8/1986 | White . |
| 5,181,675 | 1/1993 | Lardellier et al. ....................... 248/554 |
| 5,275,357 | 1/1994 | Seelen et al. ............................ 248/554 |

FOREIGN PATENT DOCUMENTS

1236917  6/1971  United Kingdom ................... 248/554

Primary Examiner—Richard A. Bertsch
Assistant Examiner—William Wicker
Attorney, Agent, or Firm—Andrew C. Hess; Bernard E. Shay

[57] ABSTRACT

An engine mount assembly includes an axially pivotable engine support and a thrust mount with a three or four bar linkage which includes a thrust bar, as the first bar, pivotably joined to a forward axial position on the engine structure at the forward end of the first bar. The line of action of the thrust bar intersects the engine centerline at a forward vertical mount plane, which is generally perpendicular to the engine centerline and through which a forward pivotal support mount of the engine support acts to support the engine, substantially at the axial position where engine centerline and forward vertical support plane intersect. An alternate embodiment of the present invention provides a means to counter bending moments produced by aerodynamic forces acting on the nacelle of the engine particularly those referred to as lip loads. The line of action intersects the engine centerline a predetermined distance S aft of the forward vertical mount plane to induce a predetermined first bending moment due to thrust loads to counter a predetermined second bending moment due to aerodynamic loads acting on a nacelle of the engine such that the first and second bending moments act in opposite directions.

18 Claims, 7 Drawing Sheets

AIRCRAFT GAS TURBINE ENGINE THRUST MOUNT

BACKGROUND OF THE INVENTION

1. Field of the Invention

The present invention relates generally to aircraft mounted gas turbine engines, and, more specifically, to a thrust mount which substantially eliminates engine case deflection caused by engine backbone bending due to thrust loads.

2. Description of Related Art

A principal type of modern aircraft gas turbine engine in usage today is of the turbofan type. All of the working medium gases are directed through the fan section of the engine. A portion of the working medium gases from the fan section exit is directed through the compression, combustion, and turbine sections of the engine core. The remaining fan exhaust is directed outboard around the engine core. Both the fan discharge and the core discharge flows produce thrust and can be mixed together prior to discharge to improve thermal efficiency or can be discharged individually. The diameter of the engine at the fan stages is typically quite large, on the order of ten feet and larger for high by-pass ratio engines of the eighty thousand pound thrust class.

Each engine is supported by an aircraft structure, for example, on a pylon extending downwardly beneath the wing. The engine is typically mounted and secured to the aircraft by two connections, one towards the forward end of the engine, usually just rearward of the fan section and a second toward the aft end of the engine, typically in the turbine section. The engine static structure is made up of casings and frames. The engine mount is usually attached to an engine frame, a static structure, which supports the rotating components generally referred to as rotors. The engine static structure generally has sub-structures including a forward frame and an aft frame connected by a core engine casing often referred to as a backbone. Forward and aft frames having radially extending structural struts typically support the engine bearings which in turn rotatably support the rotors within hubs of the frames. Typically a dual rotor engine has a forward fan frame and a rear turbine frame that support the main rotor bearings wherein the fan frame supports a thrust bearing and the rear turbine supports a roller bearing. Many engines have intermediate frames such as a mid-turbine frame. Frames can support more than one rotor.

In a top mounted engine, the casing usually is suspended from an overhead portion of the aircraft, such as the wing, by a forward vertical mount assembly that extends downwardly from the aircraft to interconnect with the upper portion of the casing, such as the fan casing, and an vertical mount assembly that extends downwardly from the aircraft to interconnect a rearward section of the engine core, such as a turbine frame. Thrust produced by the engine are reacted out through the engine and to the aircraft by engine thrust mounts.

The advent of large, high by-pass turbo-fan jet propulsion engines with their greater flexibility has resulted in relatively large deflections occurring between the engine casings and the rotors of engines that have been mounted to the aircraft by conventional means, thereby resulting in rubbing contact between the rotor blade tips and the engine casings. When the engines are operated at full power, such as during take-off, the high thrust loads that act through the engine must be reacted by the engine thrust mounts. Since the engine thrust mounts are generally offset from the longitudinal center of the engine along and through which the thrust acts, bending moments are generated in the engine cases by the offset. The large bending loads resulting therefrom cause moment and deflection of the engine components resulting in interference between the rotor blades and seals and their associated casings.

In addition, when the aircraft is disposed at a high angle of attack, such as during take-off, the air flowing around and through the inlet cowl lip pushes upwardly resulting in a bending moment being transferred from the cowling to the rearwardly interconnected fan casing and inwardly through the fan struts into the core casing. This bending moment can result in further deflection of the casings and adds to the interference between rotating and stationary portions of the engine.

Excessive blade and seal wear increases the clearance between these components causing a loss of fuel efficiency. In addition, a phenomenon known as blade tip stall may result from larger clearances between the blade tips and the engine casings. This can lead to vibrational problems associated with non-synchronous whirl motion of the rotors. Moreover, when compressor blades rub against their surrounding seal, particles are removed from the blade tips and the seal. The deposition of these particles on the extremely hot turbine sections of the engine roughens the turbine blades and stators and reduces their aerodynamic efficiency. Interstage seals can also wear which will open clearances and reduce fuel efficiency.

One standard technique for eliminating tip rub has been simply to provide larger clearances between the blades and the casing or selectively pregrind the sections of the casing which are susceptible to tip rub. Typically, clearances are set to be minimum at maximum thrust with the objective of being as small as possible at cruise where fuel consumption has a big impact on aircraft system efficiency. Although this may assist in avoiding blade and seal particles from being deposited on the hot engine sections and avoiding loss of blade tip material, it results in lower fuel efficiency and can cause detrimental vibration of the rotors.

Another approach to reducing tip rubs is to thicken the engine casings and increase the number of rotor bearings to provide stiffening and better concentricity between rotors and stationary parts (casings, seals, frames). This approach, however, is very costly in terms of weight, complexity, and cost. One proposed design, disclosed in U.S. Pat. No. 4,022,018, provides a jet engine mounted in a nacelle structure having a hydraulic actuator disposed between the bottom of the fan casing and the nacelle structure in an attempt to restrain the fan casing against movement relative to the nacelle structure.

U.S. Pat. No. 4,326,682 provides a system for mounting a jet engine sideways to a boom with forward and aft linkages used to fixedly suspend the fan and turbine casing of a turbo fan engine to the boom. The mounts are laterally extending links attached to the casings and boom by clevises which fixedly hold the engine in an axial position with respect to the boom. A thrust tie extends from the rear mount to the inner casing of the engine at an oblique angle such that it intersects the engine centerline in the plane of the front links. The problem with such a design, besides being limited to sideways mountings, is that thrust loads are taken out through outer casings and frames as well as through the thrust ties.

U.S. Pat. No. 5,320,307, entitled "Aircraft Engine Thrust Mount", filed Mar. 25, 1992, and incorporated herein by reference, discloses a gas turbine engine which is typically mounted below an aircraft wing to a pylon at its forward end, an intermediate section, and its aft end for transmitting loads to the pylon. The loads typically include vertical loads such as the weight of the engine itself, axial loads due to the thrust generated by the engine, side loads such those due to wind buffeting and side accelerations, and roll loads or torques due to rotary operation of the engine. The forward and aft vertical mounts are so designated because they typically carry in-plane loads to the pylon wherein the in-plane loads are those occurring in a single axial plane extending perpendicularly outwardly from the longitudinal axis or centerline of the engine and include vertical and horizontal loads and rotary torque or moments. An aft thrust mount is provided for transferring the axially directed thrust loads from the engine to the pylon which are tension loads during forward propulsion of the aircraft, and compression loads which occur during the use of the engine's thrust reverser during braking of the aircraft upon landing. The thrust mount can be in the front also, in which case the axially directed thrust loads are transferred in tension during thrust reversal and compression during normal thrust.

This thrust mount includes a pair of 90° circumferentially spaced apart elongated thrust links pivotally joined at forward ends thereof to a conventional fan frame and at opposite aft ends pivotally joined to a lever sometimes referred to as a whiffle tree which serves as a mount platform. The two thrust links are pivotally joined to opposite ends of the lever, and the center of the lever is pivotally joined to a platform which is fixedly joined to the pylon. The several thrust link pivotal joints include conventional spherical bearings, which allow slight rotation of the thrust links in three orthogonal planes relative to the fan frame and the lever. And, the lever center joint includes a pin through a bushing for single plane rotation.

It is desirable to provide a load path from the fan frame to the pylon which substantially eliminates undesirable bending loads in the engine casing or backbone and the resultant rubbing effects on the rotor, particularly at high power thrust levels. As the size of the thrust load developed by modern turbofan engines has increased, so has the magnitude of the reaction loads and bending moment. An inefficient method of increasing stiffness is increasing part thicknesses which is very heavy and costly solution to the problem. It is therefore highly desirable to further reduce the amount of case deflection or backbone bending than that afforded by the elongated thrust yoke mount system in U.S. Pat. No. 4,603,821 and others like it. The resultant engine static structure deflection causes increased rubbing between the rotating hardware and the adjacent stationary hardware. This abrasive wear results in an adverse impact on engine performance and specific fuel consumption, and necessitates more frequent engine maintenance and overhaul. Repair and replacement of rotor blades is one of the highest operating costs for an aircraft gas turbine engine.

Increasing fuel costs and demands for improved durability accentuate the need for low weight designs and systems for substantially eliminating engine case deflection and not just diminishing backbone deflection particularly during high power settings such as at take-off. Furthermore elongated thrust links are difficult to incorporate because of the extensive amount of exterior accessories and plumbing mounted on and surrounding the outside casings and backbone structure of modern high by-pass ratio engines.

SUMMARY OF THE INVENTION

The backbone deflection due to the effect of thrust loads, and the resultant backbone bending moment, of an aircraft gas turbine engine, having a rotor assembly rotatably mounted within a static engine frame, is substantially eliminated by an engine mount assembly in accordance with the present invention. The engine mount assembly includes a vertical or sideways mounted axially pivotable engine support and a thrust mount system with a three or four bar linkage. The linkage includes a thrust bar, as the first bar, pivotably joined to a forward axial position on the engine frame at the forward end of the first bar and an axially aft extending portion of the engine casing as the second bar. The second bar extends from the forward axial position to an aft axial position on the engine frame which is pivotably connected to a first end of a third bar of the linkage, which in one embodiment is the aft vertical support mount of the pivotable engine support. The linkage is fixedly mounted to the aircraft through the pylon or other mounting element between the first and third bars such as by a fourth bar which is pivotably linked to the aft end of the first bar and a second end of the third bar. The line of action of the thrust bar intersects the engine centerline at the forward vertical mount plane, which is perpendicular to the engine centerline and through which a forward pivotal support mount of the pivotable engine support acts to support the engine, substantially at the axial position where engine centerline and forward vertical support plane intersect. This substantially eliminates any bending moment in the engine structure or backbone aft of the forward end of the thrust bar for thrust load.

An exemplary embodiment of the present invention provides a pair of thrust links circumferentially spaced apart which cooperate to perform as single a thrust bar having a line of force which lies in a plane that intersects the engine centerline or line of thrust at the forward vertical support plane.

An alternate embodiment of the present invention provides a means to counter bending moments produced by aerodynamic forces acting on the nacelle of the engine particularly those referred to as "lip loads". The line of action intersects the engine centerline a predetermined distance S aft of the forward vertical mount plane (for a rear thrust mount and forward for a forward thrust mount) to induce a predetermined first bending moment due to thrust loads to counter a predetermined second bending moment due to aerodynamic loads acting on a the nacelle lip of the engine such that the first and second bending moments act in opposite directions and a resultant moment of said first and second moments has an absolute value that is less the absolute value of either of the first and second moments.

ADVANTAGES

A principal advantage of the present invention is the ability to essentially eliminate bending moment due to thrust in substantially the entire engine structure between forward and aft vertical support mounts to control concentricity of the engine structure about the engine axis and prevent rubbing between the rotor and static structure of the engine and particularly between the rotor blade tips and their seals and interstage seals during high thrust settings of the engine and over a broad range of operating conditions with a minimum of weight. Another advantage of the present invention is that it allows such a thrust mount to be used with large high by-pass ratio engines having large fans and extensive plumbing, including pipes and ducts, and engine accessories mounted on the exterior of the engine casing. These advantages result in increased fuel economy and engine component durability due to greatly reduced structure deflection along the rotor of the engine.

The present invention reduces blade and tip seal wear thereby increasing performance during take-off and cruise, reducing fuel consumption and reducing deposition of metal particles from the compressor blades and tip seals on the very high temperature components of the engine which tend to be expensive. Another advantage of the present invention is that it allows a vertically supported, top mounted or bottom mounted) high by-pass turbo fan engine to be mounted on an aircraft in such a manner so as to minimize the bending flexure and distortion of engine components caused by thrust loads and air loads on the engine inlet cowling. The present invention is also applicable for use with a side mounted engine. The present invention, particularly the aft mount embodiment, provides a short load path to the wing structure which saves aircraft and therefore system weight.

The foregoing, and other features and advantages of the present invention, will become more apparent in the light of the following description and accompanying drawing.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
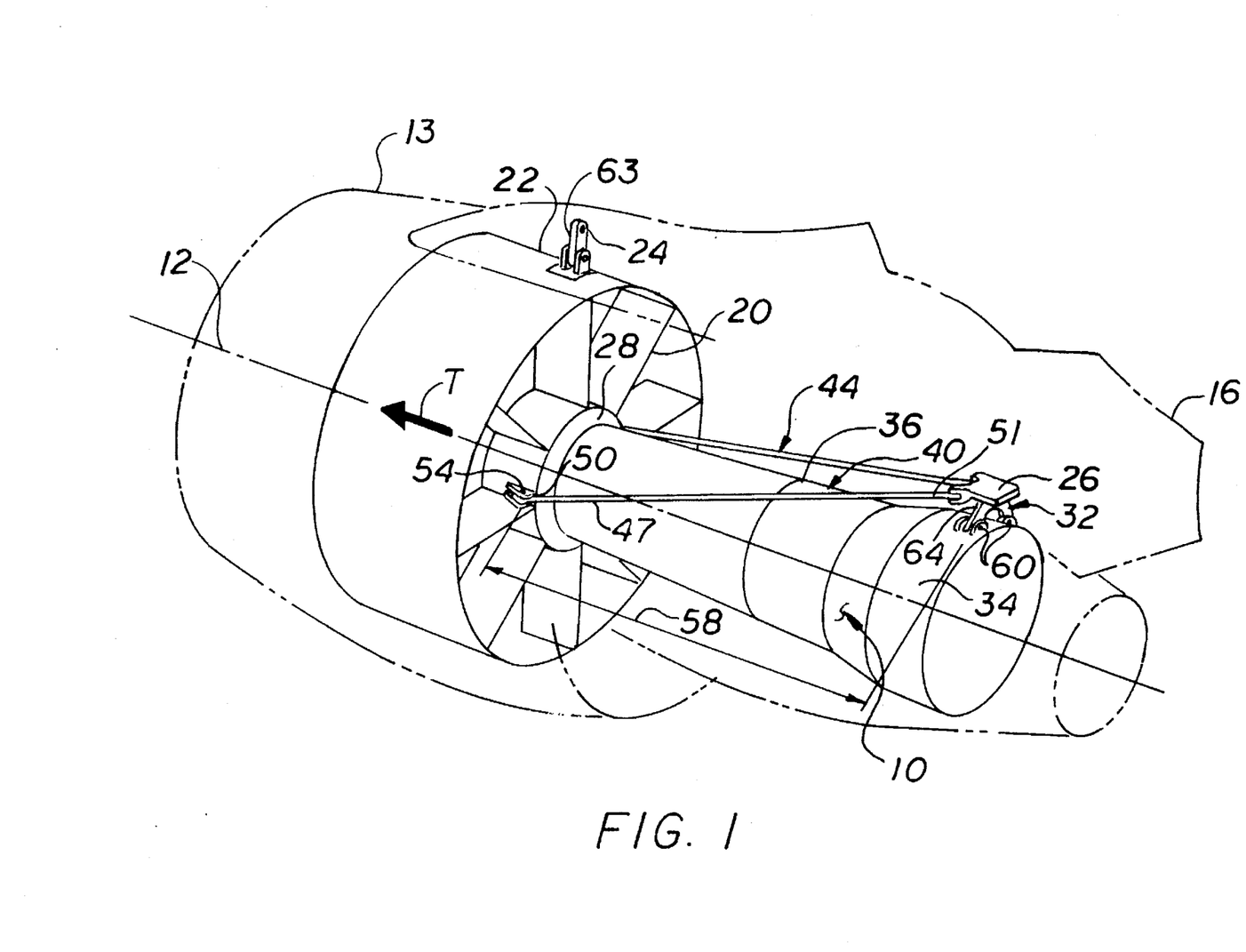
FIG. 1 is a schematic perspective view of a typical gas turbine engine including an engine mount assembly in accordance with an exemplary embodiment of the present invention having an aft or rear thrust mount.
Figure 2:
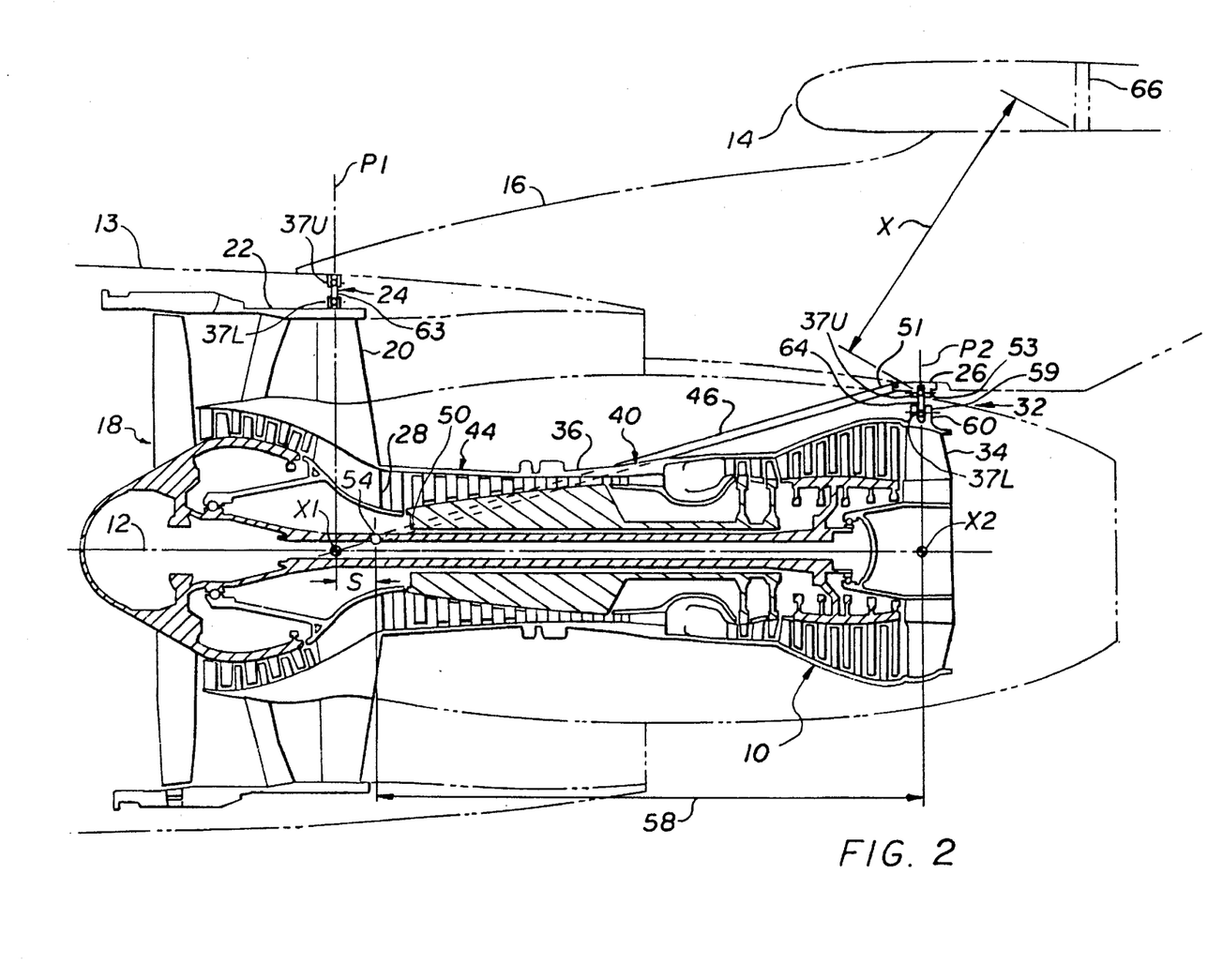
FIG. 2 is a cross-sectional side view of the gas turbine engine and the engine mount assembly depicted in FIG. 1.

Illustrated schematically in FIGS. 1 and 2 is a typical turbofan gas turbine engine 10 having a longitudinal centerline axis 12 and which is generally disposed within a nacelle 13 and mounted to a conventional wing 14 (shown in FIG. 2) of an aircraft by a conventional pylon 16. More specifically, the engine 10 includes a conventional fan section 18 including a conventional annular fan or forward frame 20 having a fan casing 22 conventionally fixedly joined in the engine 10. An engine structure 40 includes the fan frame 20 connected to a conventional aft or turbine rear frame 34 by a core engine casing 36. A pivotable engine support includes a forward vertical support mount 24 and an aft vertical support mount 32 to pivotably join and support the engine structure 40 to the pylon 16. The forward and aft vertical support mounts 24 and 32 respectively are each schematically illustrated as having two spherical bearing joints, an upper spherical bearing joint 37U and a lower spherical bearing joint 37L, which permit axial movement of the forward end of the engine 10 primarily to accommodate to thermal growth of the engine. The upper and lower spherical bearing joints 37U and 37L respectively are disposed at opposite ends of a forward mount link 63 and an aft mount link 64.

The thrust mount assembly of the present invention includes an aft thrust mount 26 (also conventionally referred to as a mounting platform), in accordance with the exemplary embodiment of the present invention, and a pair of spaced apart thrust links 47 which extend between a hub 28 of the fan frame 20 and the pylon 16 for carrying thrust force generated by the engine 10 to the pylon 16. The thrust links 47 cooperate and perform as a single thrust bar (denoted as 46 in FIGS. 2–10) used to schematically illustrate the invention in FIGS. 2–10. The thrust mount 26 is referred to as an aft thrust mount because the thrust is taken off of the engine at an aft position on the engine such as the aft vertical mount plane P2. The present invention contemplates other embodiments having different relative positions such as about a forward or a mid-engine position. The thrust mount assembly preferably also includes the aft vertical support mount 32 which pivotably connects the turbine rear frame 34 of the engine structure 40 to the pylon 16. The aft vertical support mount 32 acts through an aft vertical mount plane P2 that is normal to and intersects the centerline axis 12 at a second axial position X2. The fan frame 20 and the turbine rear frame 34 are disposed coaxially about the centerline axis 12 and fixedly joined to forward and aft ends of an engine backbone in the form of the core engine casing 36 to form the rotor supporting engine structure 40.

Referring more specifically to FIG. 2, the forward vertical support mount 24 acts through a forward vertical mount plane P1 that is normal to and intersects the centerline axis 12 at a first axial centerline position X1. Thrust mount assembly includes a four bar linkage 44 (which can also be a three bar linkage) having a thrust bar 46 (as the first bar) pivotably joined at a forward end 50 of the thrust bar to a forward axial position of the engine structure 40 at a forwardly located first pivotal joint 54. The thrust bar 46 is pivotably joined at an aft second end 51 of the thrust bar to the aft thrust mount 26 for the four bar linkage or directly to the aft vertical support 32 for a three bar linkage.

The thrust bar 46 is schematically illustrated as a projection onto the plane of the cross-section of the engine 10 because the thrust bar as discussed later may lie partially or totally out of the plane of the cross-section. A second bar indicated by its length 58 of the four bar linkage 44 extends aft along the casing 36 from the first pivotal joint 54 to an aft axial position on the engine structure 40 which is a second pivotal joint 60 on the engine casing 36 located aft of the first pivotal joint. The aft vertical mount link 64 of the aft vertical support mount 32 operates as the third link in the four bar linkage 44 and is pivotably attached to the engine structure 40 at a first link end 59 by the second pivotal joint 60. The aft vertical mount link 64 (the third bar in the linkage) must be pivotably attached by a third pivotal joint, such as the upper spherical bearing joint 37U of the aft vertical support mount 32, relative to the first bar (thrust bar 46) either directly (as in the case of a three bar linkage not shown) or indirectly (as shown in the four bar linkage of the exemplary embodiment illustrated herein) by having the first and third bars pivotably attached to opposite ends of an intermediate fourth bar which is preferably the aft thrust mount 26 which is fixedly joined to the pylon 16. Therefore, an aft second end 51 of the first bar (thrust bar 46) and a second link end 53 of the third bar (the aft vertical mount link 64) are pivotably disposed with respect to each other.

The thrust links 47 in the exemplary embodiment of the present invention illustrated herein perform as a single thrust bar which lie in a plane through which they act that intersects the engine centerline (line of thrust) at the forward vertical mount plane P1, which is perpendicular to the engine centerline axis 12. This substantially eliminates any bending moment due to thrust in the engine structure 40 aft of the forward end of the thrust bar 46.

When the jet reaction thrust of a gas turbine engine is imparted to an aircraft through a single thrust transfer point or through a number of transfer points in a single plane normal to the engine axis and off the axis of the engine, there is incurred a bending moment which has a maximum at the exact point or plane of thrust application and decreases to zero at the other transverse reaction point. The high bending moment may be sufficient to induce deflection and distortion along the length of the engine casing resulting in what are commonly referred to as "compressor, turbine or seal rubs." Such rubs occur when the tips of the turbine blades, fan blades or seals scrape against the inner surfaces of their associated shrouds causing a loss of material resulting in gaps. The greater the engine thrust and the greater the greater the offset of the thrust transfer point or points, the higher the bending moment in the engine structure.

The thrust mount arrangement of this invention, however, overcomes these disadvantages by directing the reaction thrust load force F through the thrust bar 46 (which may be in the form of thrust links 47) at an angle which passes through the intersection of the support plane and engine centerline axis. For an aft thrust mount 26 the relevant support plane is the forward vertical mount plane P1 while for a forward thrust mount arrangement (as shown in FIG. 8) the relevant support plane is the aft vertical mount plane P2. The thrust bar 46 are part of a 3–4 bar linkage which also includes a portion of the engine casing and the forward and aft engine support. The overall low engine bending moment achievable using various embodiments of the present invention may be more readily appreciated by referring to the graphical representation of engine bending moments shown in FIGS. 3–10.

FIGS. 3–10 graphically illustrate engine bending moment due to thrust T, which is equal to thrust loading times the offset distance D which is the distance that the engine mount is offset from the engine centerline, as a function of the axial length of the engine for the different thrust mount arrangements shown in these FIGS. The ordinate representing actual engine bending moment and the abscissa corresponding directly to the engine axis. Whereas the forward and aft vertical support mounts 24 and 32 respectively counteract the bending moment induced by the thrust mount, there can be seen to be zero bending moment at the locations of these mounts. The curve labelled TM in each FIG. represents the engine thrust bending moment TM for the thrust mount arrangement of this invention which is essentially 0 between the forward and aft support mounts 24 and 32 respectively along the engine structure 40. A curve labelled TMC in a number of FIGS. is a representation of engine thrust bending moment for conventional thrust mount arrangements for the purpose of illustrating some of the elements and advantages of the present invention and has a maximum value of T×D.

Figure 3:
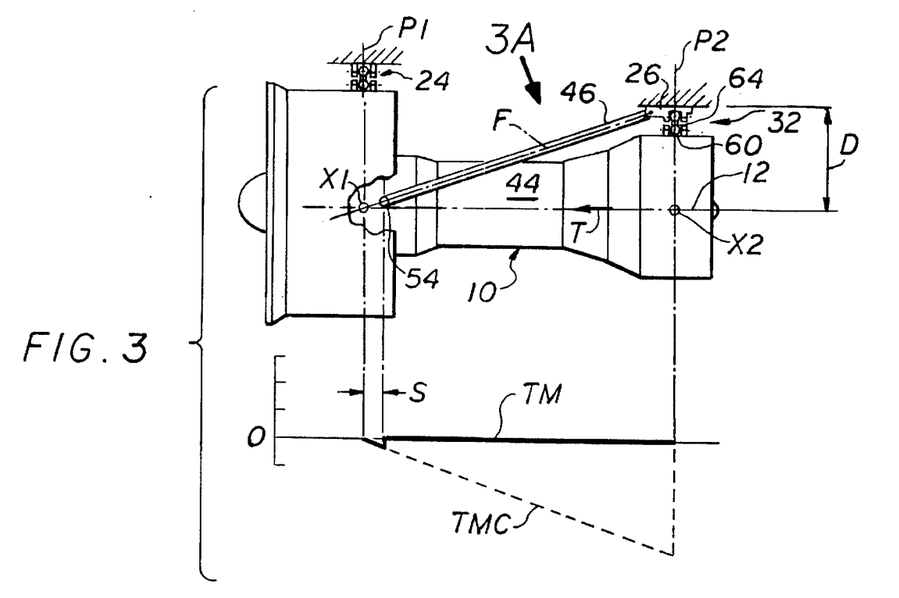
FIG. 3 is a side view of the gas turbine engine and a bending moment graph in accordance with a first embodiment of the present invention illustrated in FIGS. 1 and 2.

Schematically illustrated in FIG. 3 is the exemplary embodiment of the present invention as illustrated in FIGS. 1 and 2, wherein the engine 10 and the thrust mount 26 which includes a four bar linkage 44. The thrust bar 46 has a line of force F which substantially but not exactly intersects the centerline axis 12 at the first axial centerline position X1 where the centerline axis 12 intersects the forward vertical mount plane P1. The first pivotal joint 54 is disposed a very short distance S aft of the forward vertical mount plane P1 for practical engine design considerations such as to accommodate and not interfere with the hub 28 of the fan frame 20 or other structural elements of the engine structure 40. Note that because the thrust bar 46 is not attached to the engine casing exactly at the first axial centerline position X1 and there is a small moment induced in the engine structure 40 or backbone from the forward vertical mount plane P1 along the distance S aft to the axial position at the first pivotal joint 54. As shown in the bending moment diagram, there is no bending moment induced in the engine structure 40 due to thrust between the first pivotal joint 54 and the aft vertical mount plane P2 and only a small and insignificant amount of bending moment induced in the engine structure 40 between the forward vertical mount plane P1 and the first pivotal joint 54. This illustrates the primary purpose of the present invention namely to substantially induce zero bending moment between the forward and aft ends of the thrust mount 26 and its linkage 44 which axially extends from the forward most or first pivotal joint 54 and the second pivotal joint 60 on the engine structure 40. Wherein the bending moment is due primarily to thrust loads.

Figure 3A:
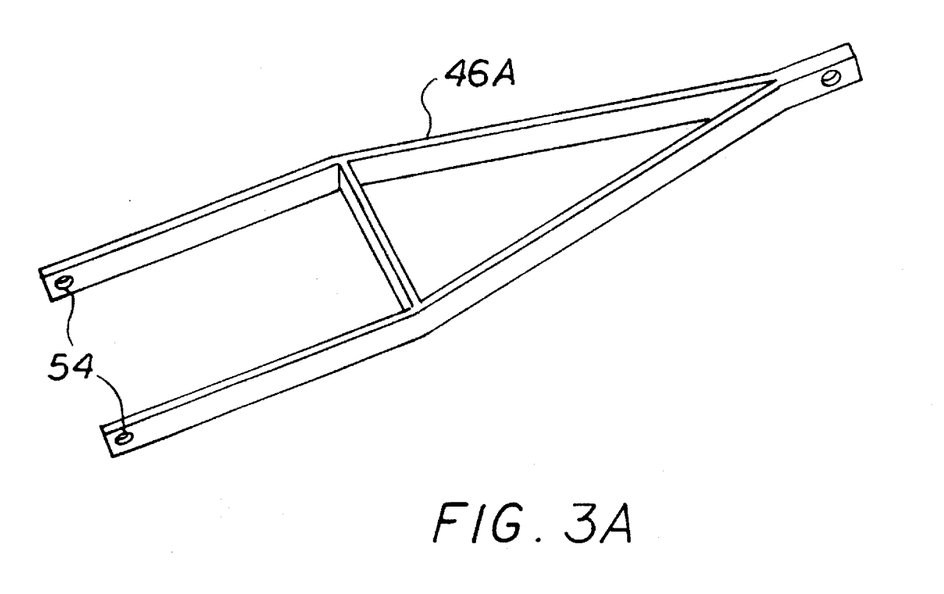
FIG. 3A is a perspective view of an A frame yoke which may be used in accordance with an embodiment of the present invention such as the exemplary embodiment of FIG. 3.

Several variations of this first embodiment of the present invention are contemplated and explained further herein. Note that the invention contemplates either a four bar linkage as shown in FIGS. 1–4 and 6–10 or a three bar linkage shown in FIG. 5. Therefore, the invention is described as having a three or four bar linkage for the purposes of this patent. The mounting means illustrated in FIG. 5 has a three bar linkage whereby the fourth bar shown or illustrated as the aft thrust mount 26 in the other FIGS. is not used and the aft vertical mount link is pivotally attached to the aft end of the thrust bar 46. Because of the greater radial clearance afforded by the four bar linkage it may be necessary or more desirable to employ such a design to clear plumbing and other attachments which may be externally mounted on the engine casing 36. The shape of the engine casing itself may make a four bar linkage more desirable from a clearance standpoint. The thrust bar 46 may still have two circumferentially spaced apart thrust links as shown in FIGS. 1 and 2 or a one piece yoke as illustrated in FIG. 3A.

A yoke typically includes a single leg extending from the aft vertical support mount 32 to the first pivotal joint 55 in FIGS. 1 and 2. A yoke may also have a split or Y shaped leg or a yoke or have an A frame 46A as illustrated in FIG. 3A having circumferentially spaced apart ends which are pivotally attached to first pivotal joints 54 on either side of the engine structure 40 such as on the hub 28 in FIGS. 1 and 2.

Figure 4:
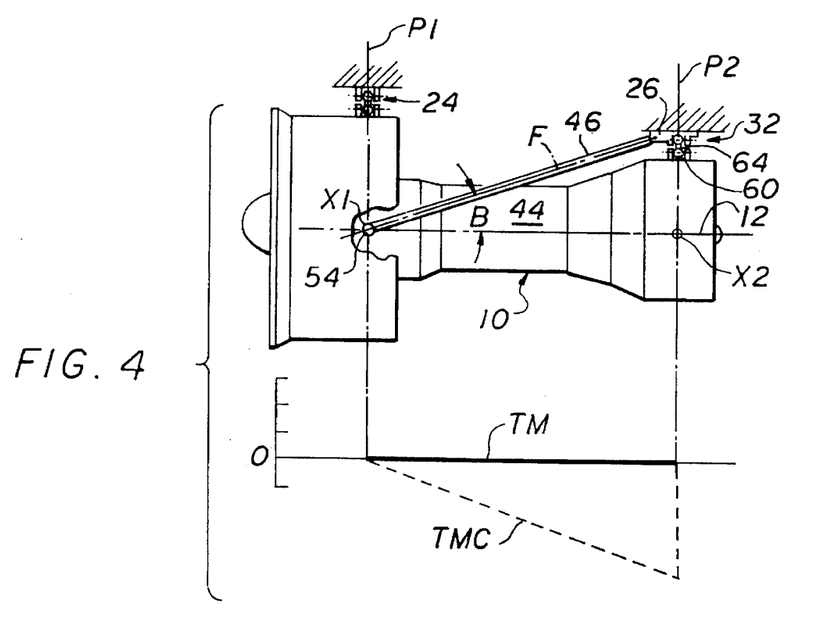
FIG. 4 is a side view of a gas turbine engine and a bending moment graph in accordance with a second embodiment of the present invention.

Illustrated in FIG. 4 is a second embodiment of the present invention having a thrust bar 46 which extends forward and is pivotally attached at the first pivotal joint 54 exactly at the first axial centerline position X1 which is the intersection of the forward vertical mount plane P1 and the engine centerline axis 12.

Figure 5:
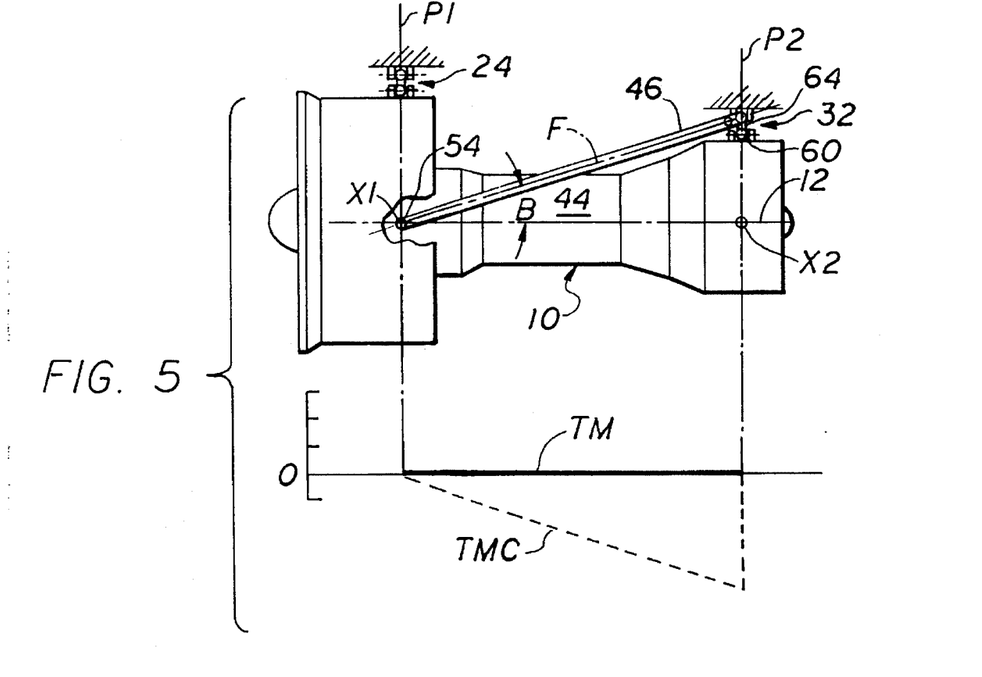
FIG. 5 is a side view of a gas turbine engine and a bending moment graph in accordance with a third embodiment of the present invention.

FIG. 5 illustrates a three bar linkage 44 whereby the first pivotal joint 54 is set off from the first axial centerline position X1 for various mechanical or design considerations. Note that the bending moment diagram for the embodiment shown in FIG. 5 is similar to the one for the embodiment shown in FIG. 4. The bending moment gradually grows to its maximum level at the first pivotal joint 54 and then decreases to zero and remains as such between the first pivotal joint and the aft vertical mount link or plane P2. However, the embodiment incorporating the four bar linkage in FIG. 4 has a larger angle B between the thrust bar 46 and centerline 12 than in the three bar linkage embodiment in FIG. 5. The four bar linkage provides more clearance between the thrust bar 46 and engine components and accessories mounted externally of the engine casing 36 as compared to embodiments with the three bar linkage. However the three bar linkage with a more shallow angle B can provide a better load distribution for the aircraft at the pylon. The three bar linkage can also allow the use of a radially shorter aft vertical support mount 32 which has an axially shorter aft thrust mount 26 which in turn allows the engine 10 to be mounted closer to the pylon 16 and the wing 14.

This feature is illustrated in FIG. 2 by a line of action X between aft thrust mount 26 and a load carrying spar 66 in the wing 14. The longer the line of action X is the stronger and heavier the structure of pylon 16 and the wing spar 66 will have to be. It is often advantageous to take out the thrust loads from the engine as close as possible to the spar 66 to minimize the loads acting on and weight of the aircraft structure. The three bar linkage thrust mount system illustrated in FIG. 5 is capable of producing a more advantageous load distribution on the pylon and the wing and lower torques on the wing due to thrust loads as compared to a comparable four bar linkage.

Figure 6:
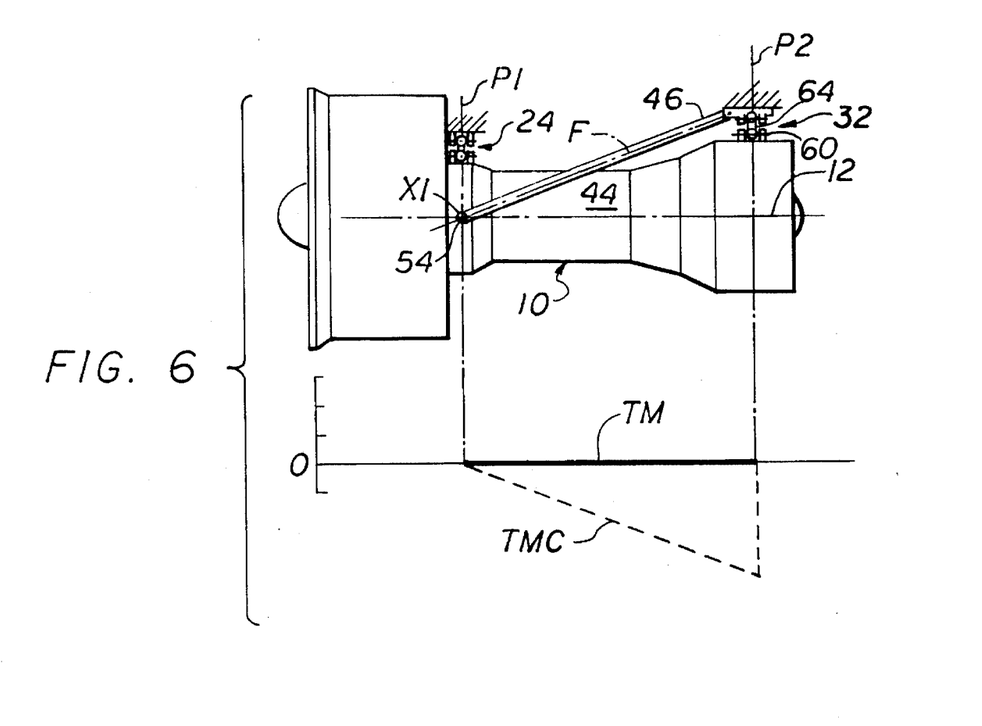
FIG. 6 is a side view of a gas turbine engine and a bending moment graph in accordance with a fourth embodiment of the present invention.

Referring now to FIG. 6, the engine 10 is shown having a forward vertical support mount 24 that is radially inward of the fan casing 22 and is located on the hub 28 for example. This moves the forward vertical mount plane P1 aft of the location in the previous embodiments thereby allowing a shorter thrust bar 46 to exactly intersect the engine centerline axis 12 at P1. Again no bending moment is induced into the engine casing 36 in this particular embodiment and the thrust bending moment TM is zero between the forward and aft vertical mount planes P1 and P2.

Figure 7:
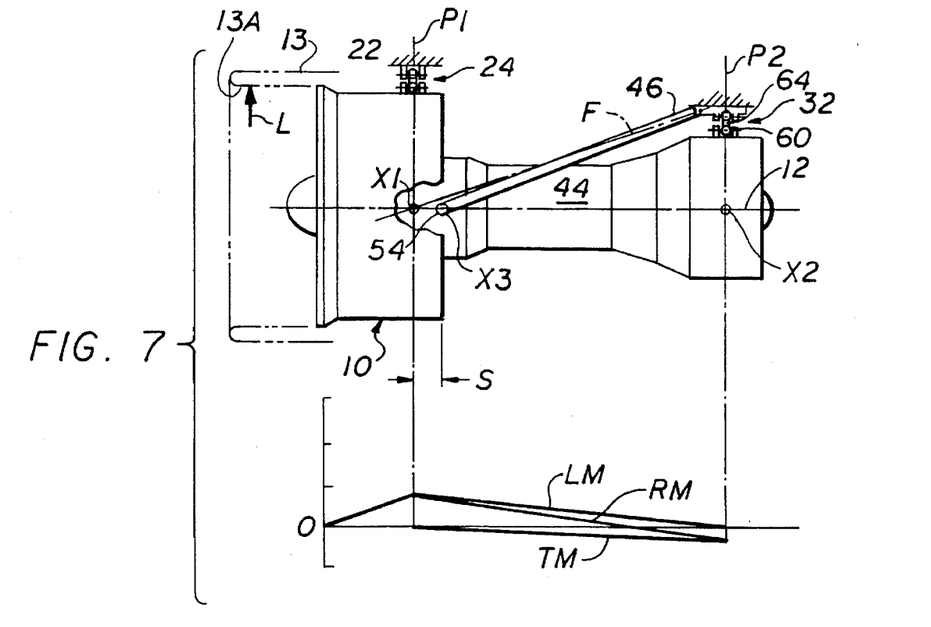
FIG. 7 is a side view of a gas turbine engine and a bending moment graph in accordance with a fifth embodiment of the present invention.
Figure 8:
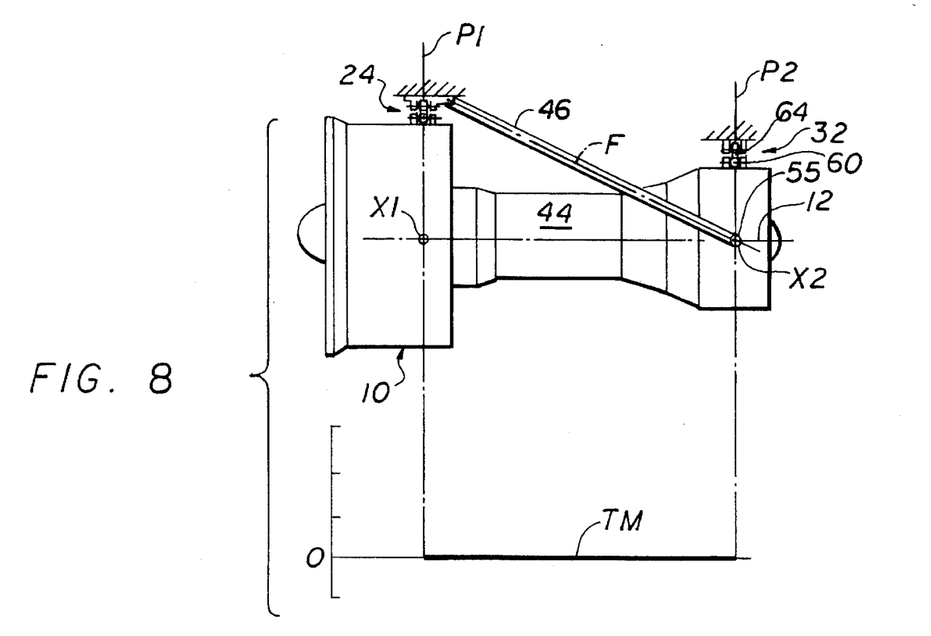
FIG. 8 is a side view of a gas turbine engine and a bending moment graph in accordance with a sixth embodiment of the present invention.

Illustrated in FIG. 7 is a mounting means for using the present invention to counter bending moments due to what is commonly referred to as nacelle lip loads. It is known that during various operations of the engine and aircraft, a vertical force is induced into the engine by what are known as nacelle lip forces L acting on a lip 13A, usually an upper lip, of the nacelle 13 which surrounds the fan. This causes a bending moment through the engine structure 40 to which the nacelle 13 is tied by way of the fan casing 22. The engine casing bending moment due to the lip forces L is steadily increased to a maximum point at the forward vertical mount plane P1 and then steadily decrease to zero at the aft vertical mount plane P2 as shown by LM in the bending moment diagram. It is possible and perhaps desirable to design a thrust mount 26 with a thrust bar having a line of force F which purposely misses the first axial centerline position X1 (the intersection of the forward vertical mount plane P1 and the engine centerline axis 12) by a predetermined distance S. In so doing, a purposely and predetermined amount of bending moment due to the thrust loads T can be induced in a direction opposite to that of the lip bending moment LM.

Typically, for a rear thrust mount, the lip moment LM cancels some of the thrust bending moment TM and for a front thrust mount the lip moment LM is additive with the thrust bending moment TM. The thrust bending moment TM can be vectorally combined with the lip moment LM to yield a resultant moment RM through the portion of the engine structure 40 between the forward vertical mount P1 and the aft vertical mount plane P2 as shown in FIG. 7.

The resultant moment RM is less in its absolute value and therefore will cause smaller deflections in the engine structure 40 than either of the two bending moments by themselves, LM or TM. It is therefore one objective of this embodiment of the present invention to having a thrust bar 46 having a line of force F angled with respect to the engine centerline axis 12 such that the line of force F intersects the engine access 12 aft of the first axial centerline position X1 between the forward vertical mount plane P1 and engine centerline axis 12. The intersection of the line of force F with the engine centerline axis 12 is at a third axial centerline position X3 and the distance S between X3 and X1 is chosen such that the thrust moment TM is in the opposite direction of the lip moment LM and that the resultant moment RM is less than absolute value then either the lip moment or the thrust moment along the engine structure 40.

The embodiment illustrated in FIG. 8 is commonly referred to as a forward thrust mount where the thrust is taken off of the engine at a forward position such as the forward vertical mount plane P1. The thrust bar 46 is angled radially inward and axially aftward from the radially outer position of the forward vertical support mount 24 to an aftwardly located alternative first pivotal joint 55 as opposed to the forward thrust mounts of the previous embodiments where the thrust bar 46 is angled radially outward and axially aftward from the radially inner position of the forwardly located first pivotal joint 54. The same variations as previously illustrated also apply with the aft thrust mount embodiment as shown in FIG. 8. Again the zero bending moment may be accomplished between the forward and aft ends of thrust bar 46 and where they intersects planes of engine such as forward vertical mount plane P1 and aft vertical mount plane P2. The thrust bar 46 has a line of force F which intersects the engine centerline at the second axial centerline position X2 in the aft vertical mount plane P2 along the engine centerline axis 12.

Figure 9:
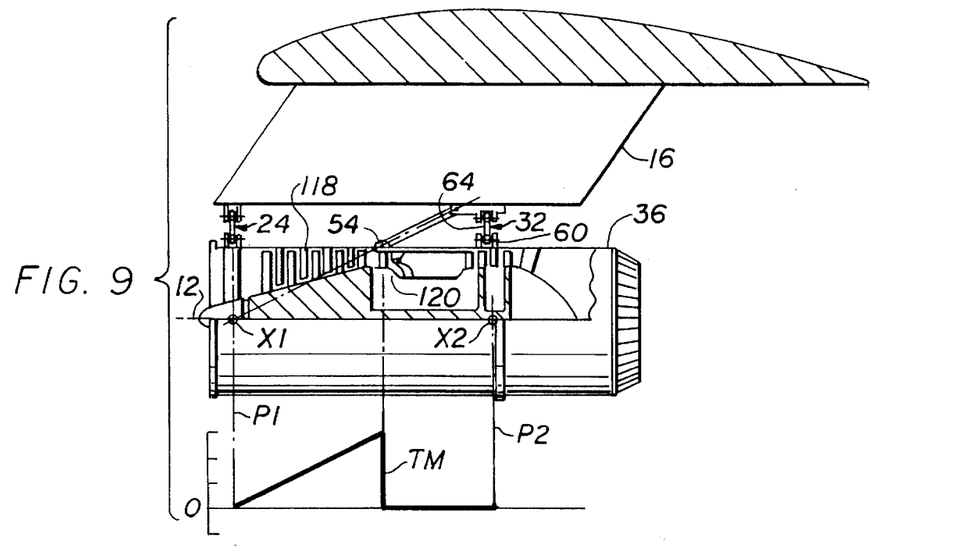
FIG. 9 is a side view of a gas turbine engine and a bending moment graph in accordance with a seventh embodiment of the present invention and which serves to illustrate a side mounted engine embodiment of the invention.

FIG. 9 illustrates the present invention applied to an engine 10 having an intermediate frame at the aft end of a compressor section 118 of the engine 10 such as a compressor rear frame 120 to which the thrust bar 46 is attached by the first pivotal joint 54 on the outside of the engine casing 36. The compressor rear frame 120 contains the diffuser assembly to diffuse the airflow from the compressor before it enters the combustor such as the one on the GE CF6 engine and similar to that found in the engine illustrated in U.S. Pat. No. 3,844,115, entitled "Load Distributing Thrust Mount". A four bar linkage 44 having the first pivotal joint 54 located on the engine casing 36 is set off from the first axial centerline position X1 for various mechanical or design considerations. The bending moment gradually grows to its maximum level at the first pivotal joint 54 and then decreases to zero and remains as such between the first pivotal joint and the aft vertical mount link or plane P2. Preferably and as is typically the case, the turbine is axially disposed between the first pivotal joint 54 and the aft mount P2 and the backbone bending in the turbine is minimized by the present invention. This embodiment is very important because turbine clearances are very important and often more significant than clearances in the compressor and fan sections of the engine.

Figure 10:
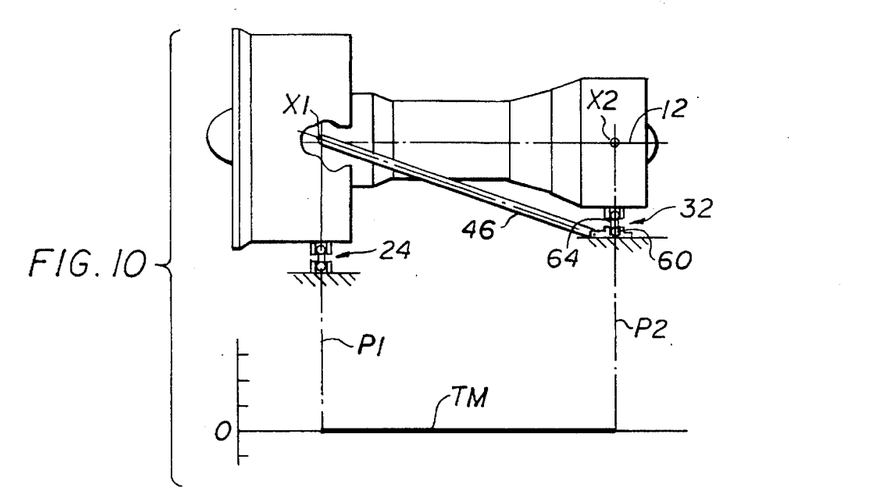
FIG. 10 is a side view of a gas turbine engine and a bending moment graph in accordance with an bottom mounted engine embodiment of the present invention.

The embodiment in FIG. 9 is also useful to schematically illustrate a side mounted engine 10 wherein the pylon 16 can be a side mount structure and the vertical support mounts 24 and 32 as side mounts. Yet another embodiment illustrated in FIG. 10 shows the engine 10 bottom mounted to a pylon 16 such as may be used on an over the wing 14 mount arrangement. In this embodiment the vertical support mounts 24 and 32 are on the bottom of the engine structure 40.

While the preferred embodiment of the invention has been described fully in order to explain its principles, it is understood that various modifications or alterations may be made to the preferred embodiment without departing from the scope of the invention as set forth in the appended claims.

I claim:

1. A mount assembly for mounting an aircraft gas turbine engine to an aircraft by its engine structure which supports the engine rotor assembly about an engine centerline, said mount assembly comprising;

a pivotable engine support for suspending the engine from the aircraft including a forward support mount and an aft support mount which permit at least limited axial movement of the engine such that a thrust bar of a thrust mount system transmits substantially all of the thrust from the engine to the aircraft, said thrust mount system having a linkage with not less than three bars and not more than four bars, said bars having oppositely disposed first and second ends, said linkage including first, second, and third bars, said first bar comprises said thrust bar pivotably joined to a forward axial position on the engine structure at said first end of said thrust bar, said second bar comprises an axially aft extending portion of said engine structure and which extends from said forward axial position to an aft axial position of the engine structure which is pivotably connected to said first end of said third bar and said third bar is a link of said aft mount, said second end of said first bar and said second end of said third bar are pivotably disposed with respect to each other, attachment means to attach said linkage to the aircraft is operably disposed between said first and third bars, and said thrust bar has a line of action which intersects the engine centerline in a forward vertical mount plane through which said forward support mount suspends the engine and which is generally perpendicular to the engine centerline.

2. A mount assembly as claimed in claim 1 wherein said linkage is a four bar linkage having a fourth bar disposed between said first and third bars and said fourth bar is fixedly mounted to the aircraft.

3. A mount assembly as claimed in claim 1 wherein the engine having a top and bottom is bottom mounted, said pivotable engine support is a vertical support for suspending the engine vertically above a pylon of the aircraft, said forward mount is a forward vertical support mount disposed on the bottom of the engine, and said aft support mount is an aft vertical support mount disposed on the bottom of the engine.

4. A mount assembly as claimed in claim 1 wherein the engine having a top and bottom is bottom mounted, said pivotable engine support is a vertical support for suspending the engine vertically over a wing of the aircraft, said forward mount is a forward vertical support mount disposed on the bottom of the engine, and said aft support mount is an aft vertical support mount disposed on the bottom of the engine.

5. A mount assembly as claimed in claim 1 wherein said linkage is a three bar linkage having said first and third bars pivotably linked to said aft support mount with essentially no fourth bar between them.

6. A mount assembly as claimed in claim 1 wherein said forward support mount and said aft support mount includes at least one spherical bearing joint which permits at least limited axial movement of the engine.

7. A mount assembly as claimed in claim 6 wherein said forward support mount and said aft support mount each include at least two spherical bearings at each joint disposed at opposite ends of a mount link at each of said joint.

8. A mount assembly as claimed in claim 1 wherein said pivotable engine support is a vertical support for suspending the engine vertically from beneath a pylon of the aircraft, said forward mount is a forward vertical support mount, and said aft support mount is an aft vertical support mount.

9. A mount assembly as claimed in claim 8 wherein said thrust mount is a forward thrust mount and said thrust bar is angled radially inward and axially aftward generally from a radially outer position of said forward thrust mount.

10. A mount assembly as claimed in claim 8 further comprising an engine intermediate frame axially disposed between a forwardmost fan frame and an aftmost turbine frame and said forward axial position on the engine structure is on said intermediate frame.

11. A mount assembly as claimed in claim 10 wherein said intermediate frame is a compressor rear frame at an axially aft end portion in a compressor section of the engine.

12. A mount assembly as claimed in claim 8 wherein said linkage is a four bar linkage having a fourth bar disposed between said first and third bars and said fourth bar is fixedly mounted to the aircraft.

13. A mount assembly as claimed in claim 12 wherein said thrust bar comprises a pair of circumferentially spaced apart thrust links.

14. A mount assembly as claimed in claim 13 further comprising;

the engine structure having a fan frame including an outer annular fan casing and an inner annular hub with radially extending structural struts therebetween, an engine bearing disposed within said hub for rotatably supporting the engine rotor assembly, said forward axial position is on said hub, and said thrust links circumferentially spaced apart on and pivotably attached to said hub.

15. A mount assembly as claimed in claim 14 wherein said forward support mount is pivotably attached to the engine structure on said hub essentially at said forward axial position.

16. A mount assembly for mounting an aircraft gas turbine engine to an aircraft by its engine structure which supports the engine rotor assembly about an engine centerline, said mount assembly comprising;

a pivotable engine support for suspending the engine from the aircraft including a forward support mount and an aft support mount which permit at least limited axial movement of the engine such that a thrust bar of a thrust mount system transmits substantially all of the thrust from the engine to the aircraft, wherein pivotable engine support is a vertical support for suspending the engine vertically from beneath a pylon of the aircraft said forward mount is a forward vertical support mount, and said aft support mount is an aft vertical support mount, said thrust mount system having a linkage with not less than three bars and not more than four bars, said bars having oppositely disposed first and second ends, said linkage including first, second, and third bars, said first bar comprises said thrust bar pivotably joined to a forward axial position on the engine structure at said first end of said thrust bar, said second bar comprises an axially aft extending portion of said engine structure and which extends from said forward axial position to an art axial position of the engine structure which is pivotably connected to said first end of said third bar and said third bar is a link of said aft mount, said second end of said first bar and said second end of said third bar are pivotably disposed with respect to each other, an attachment means to attach said linkage to the aircraft is operably disposed between said first and third bars, and said thrust bar has a line of action which intersects the engine centerline a predetermined distance S aft of said forward vertical mount plane to induce a predetermined first bending moment due to thrust loads to counter a predetermined second bending moment due to aerodynamic loads acting on a nacelle of the engine wherein said first and second bending moments act in opposite directions such that a resultant moment of said first and second moments has an absolute value that is less than the absolute value of said first moment and less than the absolute value of said second moment.

17. A mount assembly as claimed in claim 16 wherein said linkage is a four bar linkage having a fourth bar disposed between said first and third bars and said fourth bar is fixedly mounted to the aircraft.

18. A mount assembly as claimed in claim 16 further comprising;

said thrust bar comprising a pair of circumferentially spaced apart thrust links, the engine structure having a fan frame including an outer annular fan casing and an inner annular hub with radially extending structural struts therebetween, an engine bearing disposed within said hub for rotatably supporting the engine rotor assembly, said forward axial position is on said hub, and p1 said thrust links circumferentially spaced apart 90° on and pivotably attached to said hub.

* * * * *